United States Patent
Siu

(10) Patent No.: US 8,904,920 B2
(45) Date of Patent: Dec. 9, 2014

(54) SEMI-AUTOMATIC TEA MAKER

(75) Inventor: Eddie Siu, Chifley (AU)

(73) Assignee: Breville Pty Limited, Botany, New South Wales (AU)

( * ) Notice: Subject to any disclaimer, the term of this patent is extended or adjusted under 35 U.S.C. 154(b) by 739 days.

(21) Appl. No.: 12/863,186

(22) PCT Filed: Mar. 6, 2009

(86) PCT No.: PCT/AU2009/000269
§ 371 (c)(1),
(2), (4) Date: Jul. 16, 2010

(87) PCT Pub. No.: WO2009/109011
PCT Pub. Date: Sep. 11, 2009

(65) Prior Publication Data
US 2011/0048240 A1    Mar. 3, 2011

(30) Foreign Application Priority Data
Mar. 6, 2008   (AU) ................................. 2008901100

(51) Int. Cl.
*A47J 31/18*    (2006.01)
*A47J 31/06*    (2006.01)
*A47J 27/21*    (2006.01)

(52) U.S. Cl.
CPC ........ *A47J 31/0615* (2013.01); *A47J 27/21041* (2013.01); *A47J 31/18* (2013.01)
USPC ................................. 99/285; 99/297; 99/317

(58) Field of Classification Search
USPC ........ 99/285, 343, 323.3, 342, 275, 279, 328, 99/333; 340/691.6, 309.15, 586, 588, 589; 374/141, 142, 150, 102, 104, 106
See application file for complete search history.

(56) References Cited

U.S. PATENT DOCUMENTS

| | | | | |
|---|---|---|---|---|
| 2,808,775 A | * | 10/1957 | Schott | 99/283 |
| 4,572,253 A | * | 2/1986 | Farmer et al. | 141/95 |
| 5,453,189 A | * | 9/1995 | Joergensen | 210/238 |
| 6,111,240 A | * | 8/2000 | Kishimoto et al. | 219/720 |
| 6,121,585 A | * | 9/2000 | Dam | 219/438 |
| 6,964,222 B1 | * | 11/2005 | Tucker | 99/281 |
| 2006/0124628 A1 | * | 6/2006 | Long et al. | 219/438 |
| 2008/0274246 A1 | * | 11/2008 | Glucksman et al. | 426/425 |

* cited by examiner

*Primary Examiner* — Thien S Tran
(74) *Attorney, Agent, or Firm* — Molins & Co Pty Ltd

(57) ABSTRACT

An electric tea maker device has a vessel with a reservoir having an opening that removably receives a tea brewing chamber. The chamber has an upper portion and a lower portion. The upper portion lacks perforations and the lower portion has perforations. The device has a plunger for the chamber that, when in a depressed position within the chamber, isolates tea from the reservoir. The vessel has a sensor for detecting when the chamber is inserted into the reservoir in a brewing position, a brew countdown timer that is activated by the sensor, and an indicator for alerting a user that a brew countdown is complete.

20 Claims, 6 Drawing Sheets

SEMI-AUTOMATIC TEA MAKER

FIELD OF THE INVENTION

The invention relates to electric tea making appliances and more particularly to a semi-automatic electric tea maker.

BACKGROUND OF THE INVENTION

Electric kettles and fully manual plunger-type tea makers are well known. However, most electric kettle type appliances are only useful of bringing water to its boiling temperature and provide no user control over the brew process and no way for the user to adjust the ultimate temperature of the water processed by the kettle. This is particularly important in the area of tea making. Many teas develop their optimum flavour when made with water that is considerably below the boiling point. Different teas also have different requirements for brew time and it is well known that people's preferences for brew strength will vary.

The present invention seeks to provide a single device that is able to heat water to a variety of different temperatures, prompt the user to initiate a tea brewing operation when the water is at the correct temperature, prompt for the termination of the tea brewing process at the correct time and keep the water at the correct drinking temperature thereafter. An additional advantage of the invention is its simplicity and tidiness, in that the tea brewing process can be terminated without removing the tea from the appliance.

OBJECTS AND SUMMARY OF THE INVENTION

It is an object of the invention to provide a semi-automatic tea maker.

Accordingly, there is provided an electric vessel having the ability to heat water to a variety of ultimate brew temperatures. The vessel further comprises a tea brewing chamber comprising perforated lower portion, an unperforated upper portion and an unperforated base. The chamber is adapted to receive a tea plunger. When the bell is fully lowered, it isolates the tea in the chamber from the water around it.

In preferred embodiments, the user may select one of a variety of brew temperatures.

In other embodiments, the user selects a tea brewing duration and the apparatus prompts the user to both initiate and terminate the tea brewing process.

In yet other embodiments, the apparatus can maintain the water or brewed tea in it, at a drinking temperature that is less than the brew temperature.

The invention may provide an electric tea maker device, comprising: a vessel having a reservoir with an opening that removably receives a tea brewing chamber. The chamber has an upper portion and a lower portion. The upper portion lacks perforations and the lower portion has perforations. The device has a plunger for the chamber that when in a depressed position within the chamber, isolates tea from the reservoir. The vessel has a sensor for detecting when the chamber is inserted into the reservoir in a brewing position, a brew countdown timer that is activated by the sensor, and an indicator for alerting a user that a brew countdown is complete.

BRIEF DESCRIPTION OF THE DRAWING FIGURES

In order that the invention be better understood, reference is now made to the following drawing figures in which.

BEST MODE AND OTHER EMBODIMENTS

Figure 1:
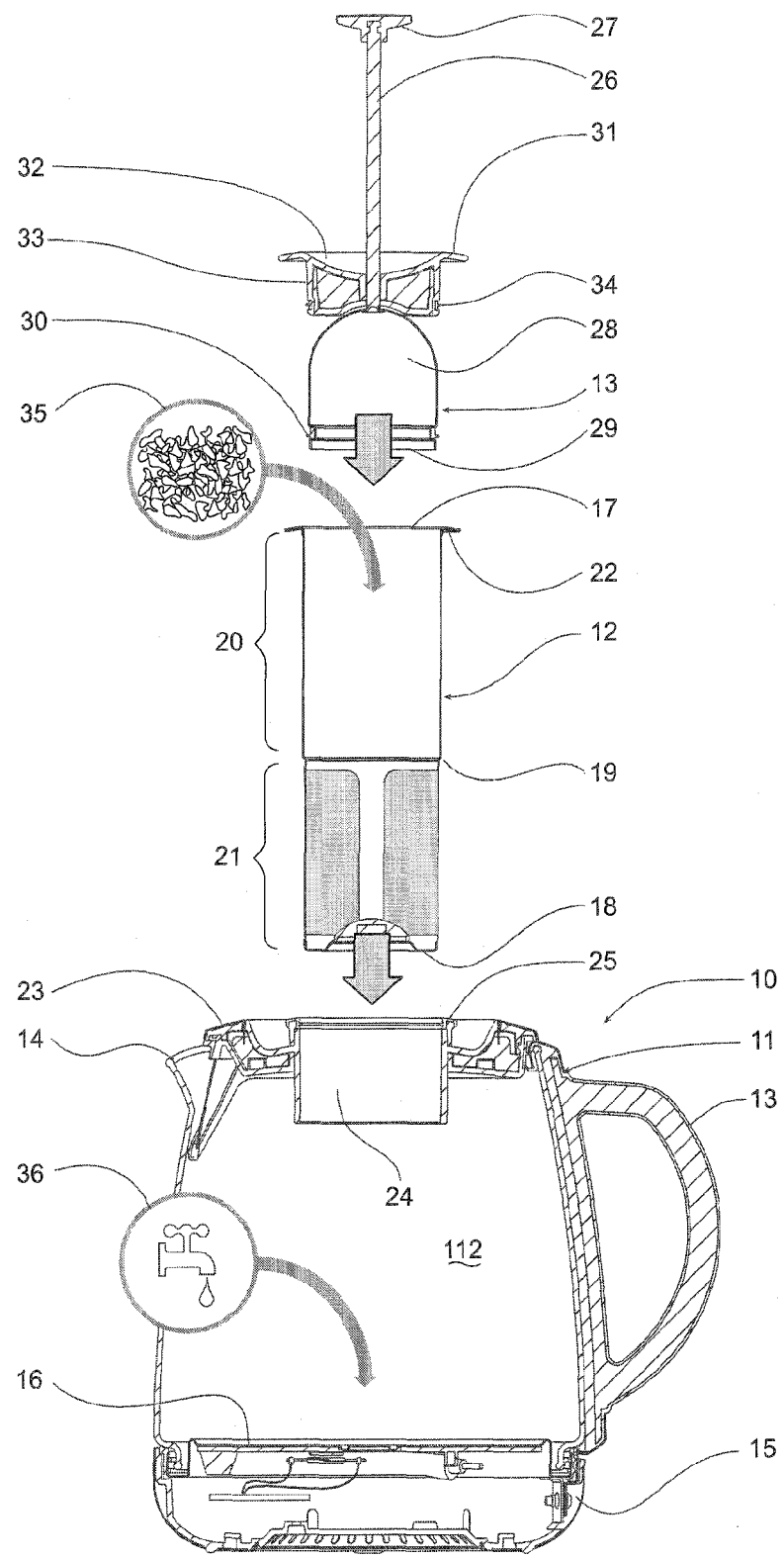
FIG. 1 is a cross sectional diagram of a semi-automatic tea maker showing the tea brewing chamber and tea plunger.

A semi-automatic tea maker 10 is depicted in FIG. 1. As shown in that illustration, the tea maker 10 comprises a vessel 11, a tea brewing chamber 12 and the chamber's plunger 13. The tea maker may be used with a cordless base platform have the appropriate coupling arrangement to support the operation of the maker 10.

The vessel 11 further comprises a water reservoir 112, a handle 13 and a pouring spout 14. The reservoir 112 is located above a base cavity 15. The base cavity 15 contains a heating element, a coupling (not shown) so that the vessel can be used in conjunction with a cordless base and, in preferred embodiments, a detector or sensor that responds when tea brewing chamber 12 is properly located adjacent to or against the floor 16 of the reservoir 112 (see FIG. 3). It will be appreciated that electronic control over and user interface for the various functions required for the successful operation of the semi-automatic tea maker 10 may be contained in the base platform (see FIGS. 2 and 3) and the power and data are exchanged between the vessel and the base platform as required. In the alternative, the electronic controls may also be located in the base cavity 15 or even in the maker's hollow handle.

The vessel 11 further comprises a lid 23 having a (e.g.) central opening 24 for receiving the tea brewing chamber 12. The opening 24 further comprises a cylindrical sleeve, the upper extent of which is defined, for example, by an elastomeric ring or bead 25. Other sleeve shapes may be used.

As shown in FIG. 1, the tea brewing chamber 12 comprises, in this example, an open ended cylindrical body having a mouth opening 17 and an impermeable floor 18. The mouth 17 is surrounded by a rim 22. A small step 19 divides the chamber 12 into an upper portion 20 and a lower portion 21. The upper portion is not perforated whereas the lower portion 21 is perforated (except for the floor 18). In preferred embodiments, the diameter of the lower portion 21 is slightly less than the diameter of the upper portion 20. As further illustrated in FIG. 1, the plunger 13 comprises a shaft 26 that extends between a knob 27 and a bell 28. The bell 28 is impermeable but for the open mouth 29, preferably encircled by an elastomeric seal 30. The shaft 26 is surrounded by a cap 31. In preferred embodiments, the cap has central depression 32 that allows for easy withdrawal of the knob 27 when the shaft 26 is fully depressed. The perimeter 33 of the cap fits within the mouth 17 of the tea brewing chamber 12. The perimeter 33 may be provide with a elastomeric seal 34 to improve the quality of the interface between the cap 31 and the chamber 12.

FIG. 1 also illustrates that loose tea 35 is placed by the user into the chamber 12 whereas water 36 is placed into the reservoir 112.

Figure 2:
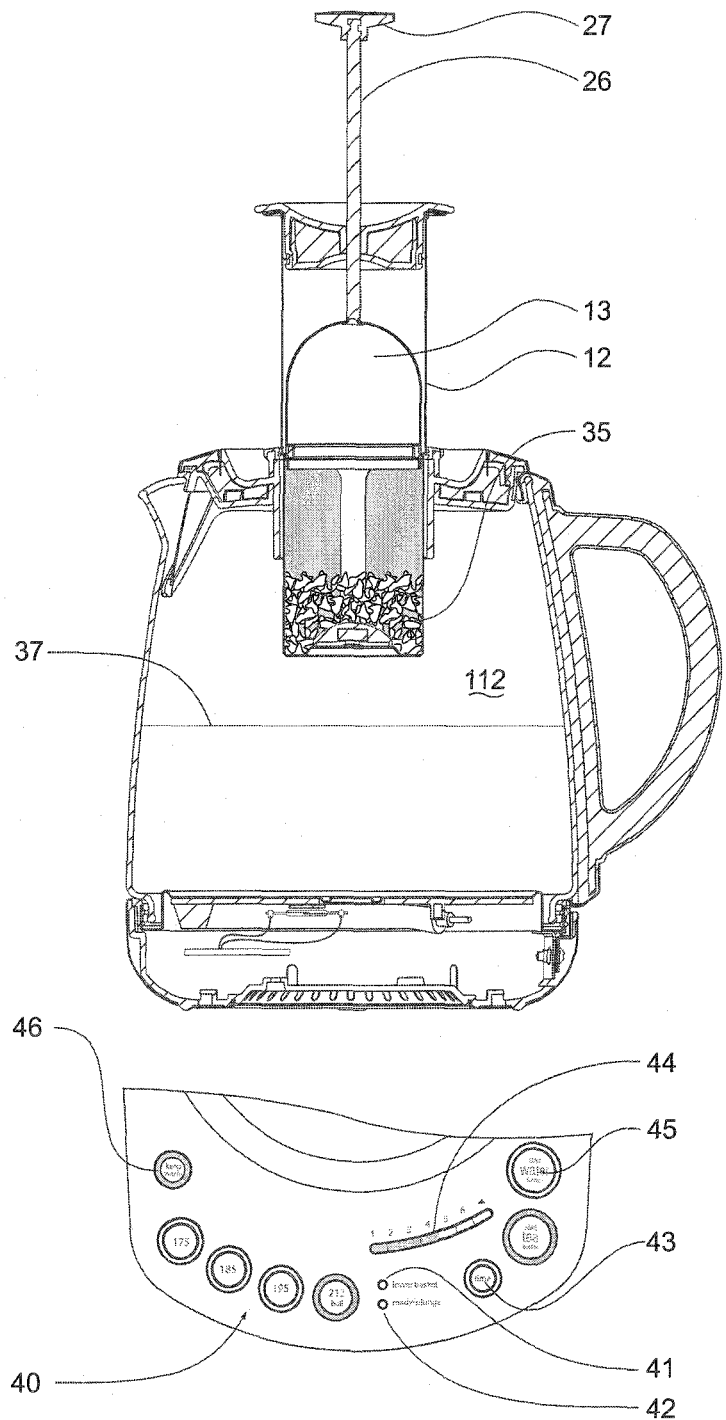
FIG. 2 is a cross section of the device depicted in FIG. 1 wherein the chamber is partially inserted and wherein the tea brewing process has not yet been initiated.

As shown in FIG. 2, tea leaves 35 are suspended above the water level 37 of the reservoir 112. This is facilitated by providing easy sliding fit or gap between the lower portion 21 of the tea brewing chamber 12 and the central opening of the vessel. When the chamber 12 is inserted into the opening, it will essentially descend and come to rest in the position illustrated owing to tactile feedback provided by the step. The larger diameter of the upper portion 20 (above the step 19) prevents the chamber from descending any further unless it is urged or pushed by the user. The bell 28 of the plunger 13 will easily descend until it contacts the step 19 where it will slightly resist, providing tactile feedback, then descending further into the lower portion 21 when pushed by the user using the knob 27. As illustrated, the user can then program the unit's controller or interface with the desired brewing temperature of the water in the vessel by pressing one of a variety of e.g. discrete temperature selection and indicating buttons or, or for example, dialling a temperature selection knob. In this illustration, four discrete buttons 40 are provided. Pressing one of these buttons 40 will cause the temperature of the water in the reservoir 12 to rise to the set brew temperature being, for example, 175, 185, 195 or 212° F. Thermostatic (e.g. thermistor) control over the water temperature prevents the water in the reservoir 12 from exceeding the brew temperature. In this example, two alerts or indicator lights 41, 42 are provided. The first indicator light 41 is illuminated by the electronic controller when the water in the reservoir 12 reaches the user set brewing temperature. The second indicator light 42 alerts the user when the brew duration, also set by the user, is reached. The user sets the brew duration with a single push button 43. Pushing the button 43 repeatedly changes the device's internal timer in, for example, one minute intervals of brew time. An illuminated countdown indicator or other alert or feedback device 44 shows the user how many minutes of brew time they have selected. In this example, brew times are set with the use of the button 43 in one minute increments ranging from 1-6 minutes. In addition to the six settings, a seventh setting caused by a further press of the button 43 causes the brew time to have an essentially infinite value, that is, the indicator 43 that indicates the end of the brew time will not function, regardless of the time duration after the inception of the brew period. If the user wants to simply use the vessel to heat water, a separate button 45 alters the programming so that brew time need not be inputted by the user. When the heat water control is activated, the user need only use the temperature control input 40 to set the desired thermostatically controlled temperature. Similarly, a "keep warm" button 46 allows single, preferably illuminated button to both allow the user to command the vessel to maintain a warm brew and to indicate when the vessel is operating in a "keep warm" mode.

Figure 3:
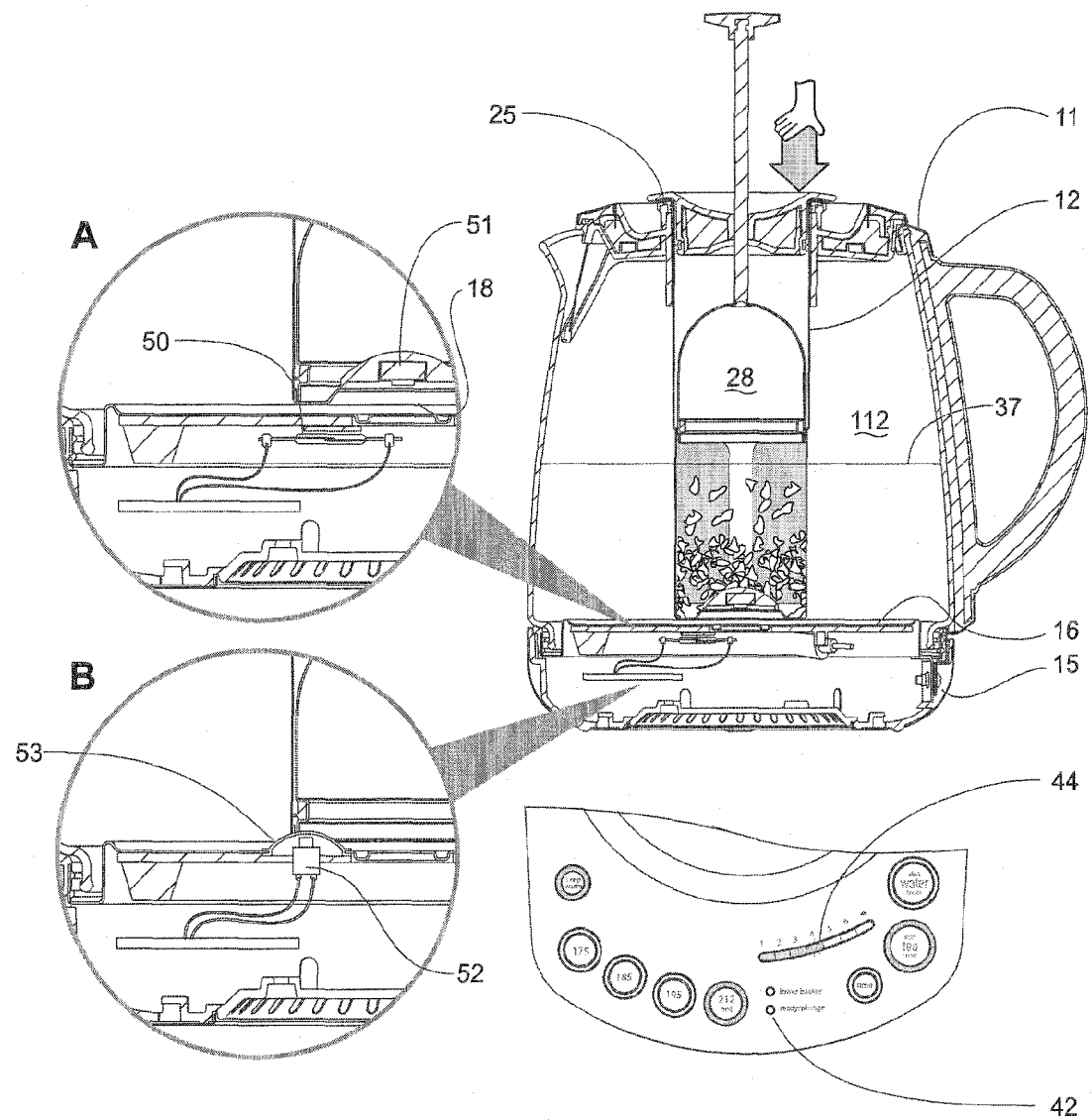
FIG. 3 is another cross sectional view of a semi-automatic tea maker made in accordance with the teachings of the present invention. Details in this drawing figure illustrate two embodiments of a brewing chamber sensor as well as the user controls.

As shown in FIG. 3, once the water in the reservoir 112 reaches the pre-established brew temperature, the appropriate alert or indicator 41 lets the user know that it is appropriate to lower the tea brewing chamber 12 fully into the reservoir by pressing it against the marginal resistance offered by the elastomeric ring or bead 25 of the central opening 24 of the vessel 11. In preferred embodiments, the base cavity 15 contains a sensor or detector that can determine when the tea brewing chamber 12 has been fully inserted into the reservoir 112. As shown in detail "A" of FIG. 3, a reed switch arrangement 50 located below the floor 16 of the reservoir 112 can detect a magnet 51 embedded somewhere in or adjacent to the base 18 of the tea brewing chamber 12. Detail "B" of FIG. 3 illustrates that the detection of the tea brewing chamber 12 can also be accomplished with a pressure sensitive micro switch or sensor 52 located beneath a flexible membrane or seal 53. Utilising either mechanism, the presence of the tea brewing chamber 12 in its lowest position will cause a signal to be sent to the cooperating microprocessor or electronic controller so that the controller's timer can begin to count down the brew duration that was pre-set by the user. The count down of the brew duration can be illustrated to the user by the display 44. Note that during the duration of the brewing process, the plunger's bell 28 is preferably located above the water level 37 and that the water in the reservoir 112 is free to enter and flow through the perforated lower portion 21 of the chamber 12. Brewing continues in this way for the duration pre-established by the user.

Figure 4:
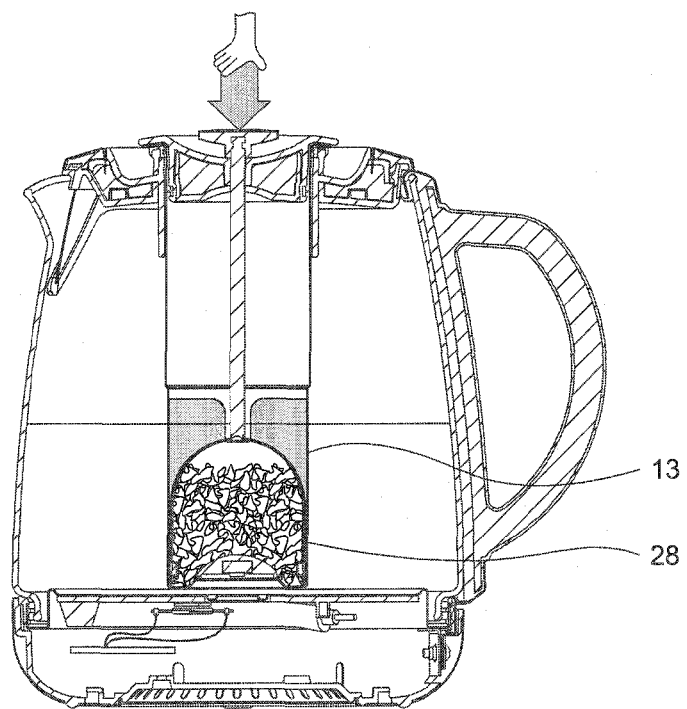
FIG. 4 is a cross section of a semi-automatic tea maker illustrating the completion of the tea brewing process.
Figure 4:
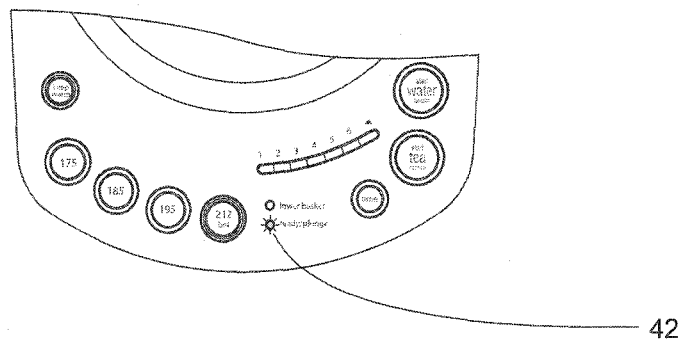

At the end of the pre-established brewing time, a visual alarm indication 42 (or an audible one) alerts the user that the pre-established brewing time is completed and that the user should terminate the brewing process by fully lowering the plunger 13. As shown in FIG. 4, the user has fully depressed the plunger 13. This causes the bell 28 to isolate the tea within it from the remainder of the reservoir. Because both the bell 28 and the floor 18 of the chamber 12 are impervious to water flow, further infusion of the water outside of the bell is essentially terminated. At this point, the thermostat, heating element and electronic controller cooperate to maintain the water in the reservoir at a warm or drinking temperature when the vessel is on its base. The vessel may be removed from its base for pouring.

Figure 5:
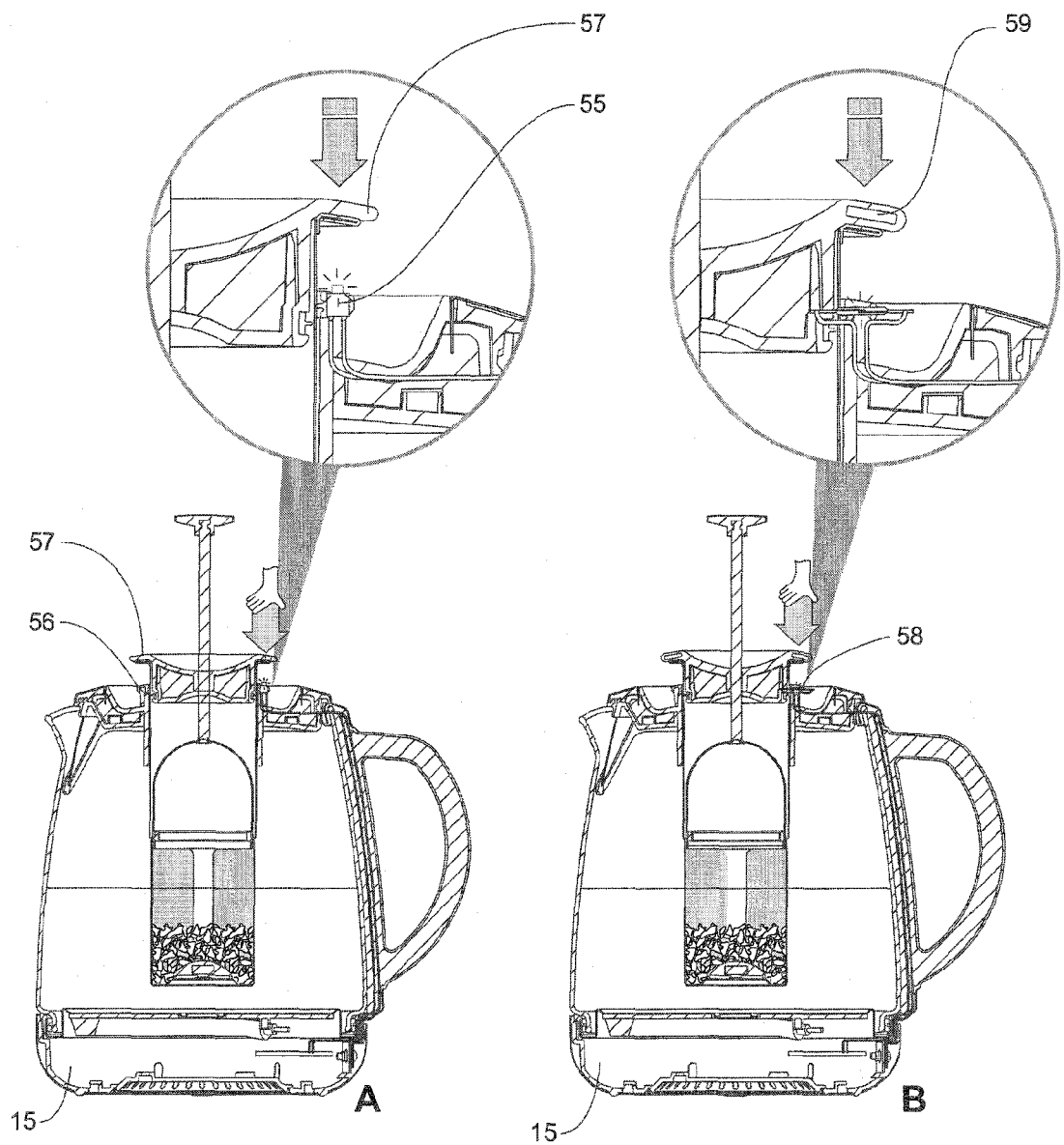
FIG. 5 illustrates alternate embodiments of the invention, in cross section.

As was discussed with reference to FIG. 3, the insertion of the tea brewing chamber 12 is detected by sensors located adjacent to or below the floor 16 of the reservoir 112. In order to isolate the sensors or detectors 50, 52 from the heat produced by the heating element, the sensors or detectors may be located in the lid. As shown in FIG. 5A, a contact switch 55 may be located adjacent to the upper perimeter of the central opening 56 of the vessel 11. Thus, lowering of the tea brewing chamber 12 causes the chamber's rim 57 to activate the switch, sensor or detector 55. Another embodiment is depicted in FIG. 5B. In this embodiment, a non-contact sensor such as a reed switch 58 is activated by the proximity of a small magnet 59 embedded in the rim 57 of the tea brewing chamber 12. The signals are transmitted by wires located in the body or handle of the vessel to the controller located, for example, in the base cavity 15.

Figure 6:
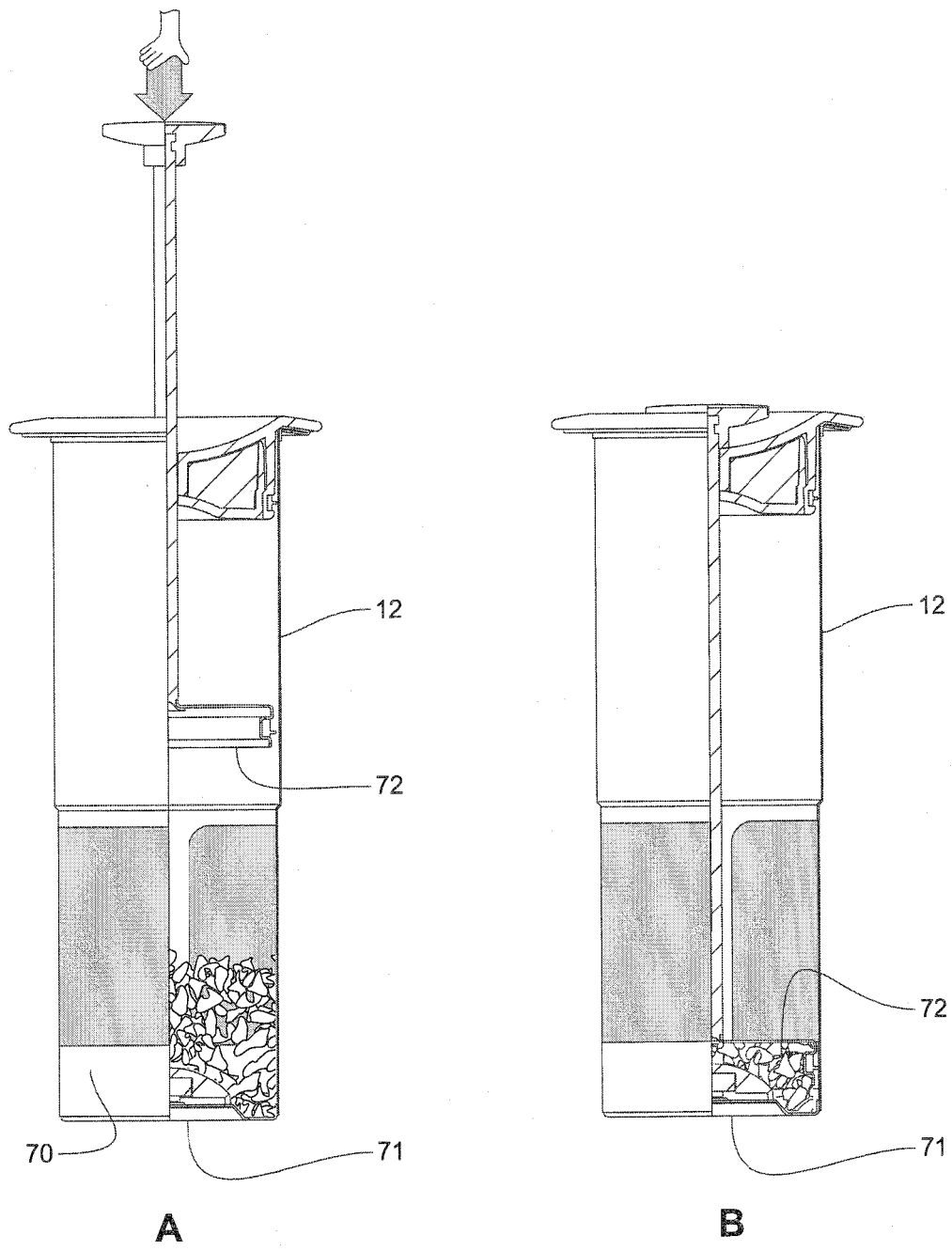
FIG. 6 are partial cross sections showing the operation of an alternate plunger style.

An alternate style of plunger is depicted in FIG. 6. In this example, a lower extent 70 of the tea brewing chamber 12 lacks perforations. As previously disclosed, the floor 71 of the tea brewing chamber also lacks perforations. A flat, plunger 72 is used in place of a bell shaped plunger. When the flat plunger 72 is fully depressed, tea leaves are trapped between the plunger, the side wall 70 and the floor 71 isolating the contents of the lower extent from the remainder of the reservoir and thus brewing ceases.

While the present invention has been disclosed with reference to particular details of construction, these should be understood as having been provided by way of example and not as limitations to the scope or spirit of the invention.

What is claimed is:

1. An electric tea maker device, having a processor and a user interface comprising:
   a vessel having a reservoir;
   the reservoir having an opening with a rim that removably receives a tea brewing chamber;
   the device having a plunger for the chamber;
   the plunger adapted, when in a depressed position within the chamber, to isolate tea that is below the plunger from a remainder of the reservoir such that a further infusion of water into the tea is essentially terminated;

the vessel having a sensor for detecting when the chamber is inserted into the reservoir in a brewing position;

the sensor located adjacent the rim, the sensor cooperating with the chamber;

the device having a brew countdown timer on the user interface that is activated by the processor after it receives a signal from the sensor, and an indicator for alerting a user that a brew countdown is complete.

2. The device of claim 1, wherein:

the chamber has upper and lower positions that are separated by a step that cooperates with the plunger to provide tactile feedback about a location of the plunger.

3. The device claim of 1, wherein:

the lower portion of the chamber has a floor that is not perforated and the plunger terminates in an impermeable bell that when fully lowered into the chamber isolates the interior of the bell from a remainder of the reservoir.

4. The device of claim 1, wherein:

The device has a microprocessor that cooperates with an interface; the user interface comprising a selector for a brew temperature, a selector for brew duration and at least one alert for indicating when a user selected brew duration has completed.

5. The device of claim 4, wherein:

the alert for indicating when a brew duration has completed comprises an illuminated countdown timer.

6. The device of claim 4, wherein:

the interface comprises a user operable control for selection of a water temperature and an indicator that is thermostatically controlled to provide an alert that a selected temperature has been reached.

7. The device of claim 4, wherein:

the interface further comprises a plurality of selectors, each one causing the water in the reservoir to rise to a different selected brew temperature.

8. The device of claim 1, wherein:

the sensor is activated by a magnet carried by the chamber.

9. The device of claim 4, wherein:

the alert is an illuminated alert.

10. The device of claim 4, wherein:

the user interface further comprises a keep warm button that communicates with the microprocessor to maintain a warm temperature in the reservoir after the brew countdown is completed.

11. An electric tea maker device, having a processor and a user interface comprising:

a vessel having a reservoir;

the reservoir having an opening with a rim that removably receives a tea brewing chamber;

the device having a plunger for the chamber;

the plunger adapted, when in a depressed position within the chamber, to isolate tea that is below the plunger from a remainder of the reservoir such that a further infusion of water into the tea is essentially terminated;

the vessel having a sensor for detecting when the chamber is inserted into the reservoir in a brewing position;

the sensor cooperating with the chamber;

the device having a brew countdown timer on the user interface that is activated by the processor after it receives a signal from the sensor, and an indicator for alerting a user that a brew countdown is complete.

12. The device of claim 11, wherein:

the chamber has upper and lower positions that are separated by a step that cooperates with the plunger to provide tactile feedback about a location of the plunger.

13. The device claim of 11, wherein:

the lower portion of the chamber has a floor that is not perforated and that plunger terminates in an impermeable bell that when fully lowered into the chamber isolates the interior of the bell from the reminder of the reservoir.

14. The device of claim 11, wherein:

the device has a microprocessor that cooperates with an interface; the user interface comprising a selector for a brew temperature, a selector for brew duration and at least one alert for indicating when a user selected brew duration has completed.

15. The device of claim 14, wherein:

the alert for indicating when a brew duration has completed comprises an illuminated countdown timer.

16. The device of claim 14, wherein:

the interface comprises a user operable control for selection of a water temperature and an indicator that is thermostatically controlled to provide an alert that a selected temperature has been reached.

17. The device claim of 14, wherein:

the interface further comprises a plurality of selectors, each one causing the water in the reservoir to rise to a different selected brew temperature.

18. The device of claim 11, wherein:

the sensor is activated by a magnet carried by the chamber.

19. The device of claim 14, wherein:

the alert is an illuminated alert.

20. The device of claim 14, wherein:

the user interface further comprises a keep warm button that communicates with the microprocessor that causes the microprocessor to maintain a warm temperature in the reservoir after the brew countdown is completed.

* * * * *